US012789289B2

(12) United States Patent
Beber

(10) Patent No.: US 12,789,289 B2
(45) Date of Patent: Nov. 10, 2026

(54) LASER MACHINING APPARATUS AND CONTROL DEVICE

(71) Applicant: SISMA S.p.A., Piovene Rocchette (IT)

(72) Inventor: Franco Beber, Piovene Rocchette (IT)

(73) Assignee: SISMA S.p.A., Piovene Rocchette (IT)

( * ) Notice: Subject to any disclaimer, the term of this patent is extended or adjusted under 35 U.S.C. 154(b) by 476 days.

(21) Appl. No.: 18/577,098

(22) PCT Filed: Jun. 24, 2022

(86) PCT No.: PCT/IB2022/055892
§ 371 (c)(1),
(2) Date: Jan. 5, 2024

(87) PCT Pub. No.: WO2023/281342
PCT Pub. Date: Jan. 12, 2023

(65) Prior Publication Data

US 2024/0307999 A1 Sep. 19, 2024

(30) Foreign Application Priority Data

Jul. 7, 2021 (IT) ........................ 102021000017924

(51) Int. Cl.
*B23K 26/08* (2014.01)
*B23K 37/02* (2006.01)

(52) U.S. Cl.
CPC ...... *B23K 26/0861* (2013.01); *B23K 26/0884* (2013.01); *B23K 37/0252* (2013.01)

(58) Field of Classification Search
CPC .. B23K 26/0884; B23K 26/032; B23K 26/03; B23K 26/04; B23K 26/043;
(Continued)

(56) References Cited

U.S. PATENT DOCUMENTS 3,913,582 A * 10/1975 Sharon .................. B23K 26/08 901/41
4,091,814 A * 5/1978 Togo .................... B23K 26/032 606/18

(Continued)

FOREIGN PATENT DOCUMENTS

DE 20122595 U1 8/2006
DE 202011104216 U1 * 1/2012 ........... B23K 26/702

OTHER PUBLICATIONS

English translation of DE-202011104216-U1 (Year: 2012).*

(Continued)

*Primary Examiner* — Chris Q Liu
(74) *Attorney, Agent, or Firm* — FERENCE & ASSOCIATES LLC

(57) ABSTRACT

A laser machining apparatus comprises a workbench for positioning an object to be machined by laser; a laser emitter configured to emit a laser beam transversely to the workbench; a movement mechanism configured to three-dimensionally move the workbench or the laser emitter reciprocally to each other; a control unit connected to the movement mechanism and/or the laser emitter and configured to generate and send an enabling signal according to operator manipulations on a manipulation element connected to the same control unit. In particular, the control unit comprises a box-like body having a supporting base, a cover panel and elastic return means interposed between the supporting base and the cover panel which are movable reciprocally towards and away from each other between an active condition and an inactive condition.

13 Claims, 3 Drawing Sheets

(58) Field of Classification Search
CPC .............. B23K 26/046; B23K 26/0643; B23K 26/702; B23K 26/042; B23K 26/044; B23K 26/048; B23K 26/0665; B23K 26/08; B23K 26/082; B23K 26/0861; B23K 26/1462; B23K 26/21; B23K 26/38; B23K 37/0252; B23K 9/10; B23K 9/32
USPC .............. 219/121.6, 121.79, 121.74, 121.78, 219/121.63, 121.67, 121.83, 132
See application file for complete search history.

(56) References Cited

U.S. PATENT DOCUMENTS 4,174,154 A * 11/1979 Kawasaki ............ G02B 7/1822 359/857
4,650,952 A * 3/1987 Akeel .................. B25J 19/0037 219/121.79
5,011,282 A * 4/1991 Ream ................... B23K 26/042 219/121.79
5,825,308 A * 10/1998 Rosenberg ............ G06F 3/0395 341/20
6,104,382 A * 8/2000 Martin .................... A63F 13/24 345/161
6,380,925 B1 4/2002 Martin et al.
6,420,680 B1 * 7/2002 Samodell ................. B23K 9/10 219/132
6,552,299 B2 * 4/2003 Bauer .................. B23K 26/032 219/121.74
7,248,940 B2 * 7/2007 Neumann ............ B23K 26/046 700/170
10,449,631 B2 * 10/2019 Kogel-Hollacher ... B23K 26/03
2001/0040553 A1 11/2001 Rosenberg
2003/0188594 A1 * 10/2003 Levin ...................... F16H 61/24 74/473.12
2007/0278194 A1 * 12/2007 Hoelsher ............ B23K 26/0884 219/121.6

OTHER PUBLICATIONS

European Patent Office, International Search Report and Written Opinion for PCT Application Serial No. PCT/IB2022/055892, Oct. 21, 2022, 12 pages.

* cited by examiner

LASER MACHINING APPARATUS AND CONTROL DEVICE

The present application is a National Phase Entry of PCT International Application No. PCT/IB2022/055892, which was filed on Jun. 24, 2022, which claims priority to Italian Application No. 102021000017924, which was filed on Jul. 7, 2021, the contents of both of which are hereby incorporated by reference.

TECHNICAL FIELD

The present invention relates to a laser machining apparatus.

In particular, the invention relates to an apparatus used in the context of movable consoles for laser machine tools, in particular manual or semi-automatic machines, comprising a protective device useful to the operator who uses the same apparatus.

The present invention further relates to a control device for the manipulation of a laser machining apparatus, preferably for the above apparatus.

Prior Art

Today, many precision machinings (engravings, welding . . . ) are preferably carried out with the aid of a laser beam. In fact, a laser beam can be collimated and aligned at the exact point where the machining must be performed. Furthermore, the action area of the laser is considerably reduced and allows to obtain machinings of great precision. Generally, in fact, the minimum diameter of a laser beam is of the order of one tenth of a millimetre.

The aforesaid laser machinings are performed with specific apparatuses in which the object to be machined is positioned on a workbench arranged below a laser emitter configured to emit an orientable laser beam. Preferably, the laser beam is directed substantially along a direction orthogonal to the aforesaid workbench. These apparatuses are provided with specific devices, the so-called “movable consoles” or “manipulators”, on which the controls that allow the use of the functions of the apparatus are located, such as the movement of the axes on which the laser emitter is mounted or the movement of the workbench.

This type of machining can require that the operator is physically present within the work area with the whole body or only with some parts, for example with the arms or hands. The fact that the manipulator is movable allows the operator to bring the apparatus controls near the point where he is operating. In these cases, the work area cannot be protected with guards that make the operator safe and, therefore, the machining to be performed can present risks to the health of the operator.

Furthermore, regardless of the presence or absence of any protective bulkheads, the possibility that some functions of the movable console are activated if the operator is far from the workstation must be avoided.

The aforesaid laser machining apparatuses can substantially have two distinct embodiments: the laser emitter can be movable with respect to the workbench, approaching and/or moving away and/or along any direction parallel to the same workbench or, alternatively, the laser emitter is constrained in a fixed position, while the workbench on which is arranged the object to be machined is movable.

Regardless, the reciprocal movement between the laser emitter and the workbench is controlled and managed by an operator who, being present in whole or in part within the work area, through the use of specific controls on the manipulator, must be able to guide the machining by moving the axes, orienting/positioning the tool, activating/deactivating the laser emission and, furthermore, must be able to continuously view the machining carried out and that to be carried out.

The presence of the operator within the work area and the impossibility of having adequate confinement systems of the work area are intrinsic features of the aforesaid apparatuses and the type of work to be performed that can involve multiple risks, including: mechanical risks (impact, crushing, shearing, etc. . . . ), specific risks of machines with laser emission (ionising radiation, including laser radiation), etc. . . .

In addition, the possibility of having axis movements (i.e., the reciprocal movement between the workbench and the laser emitter) not controlled directly by the operator must be avoided, so as to avoid possible collisions with the objects being machined or other components present in the adjacent areas which could cause damage to both the machining apparatus and to the same objects being machined.

A limit case could be the involuntary movement of the laser emitter along the vertical axis downwards, for example, due to an electrical fault or a software problem. Descending along the vertical axis, the laser emitter can hit the workbench and/or the object being machined and, therefore, cause the machine to tilt until a possible overturning.

If the operator is present and the movement speed is sufficiently low, the operator can remedy this by pressing the emergency button. Alternatively, as illustrated in documents DE20122595, U.S. Pat. No. 6,380,925 and US2001/040553, it would be possible to install on the apparatus or, possibly, on the movable consoles, safety devices capable of interrupting the operation of the same apparatus. However, such devices also have some drawbacks which the present invention aims to overcome.

SUMMARY

In this context, the technical task at the basis of the present invention is to propose a laser machining apparatus and a control device which overcome the problems of the prior art cited above.

An object of the present invention is to provide a laser machining apparatus which ensures high safety standards. Therefore, specifically, the invention aims to provide a laser machining apparatus capable of deactivating the emission and/or movement of the laser beam if the operator is not present near the apparatus, or is not controlling it directly due to, for example, a distraction or an ailment.

Another object of the present invention is to provide a laser machining apparatus which ensures ease of use for the operator, since possible safety devices do not directly interfere with his work.

A further object of the present invention is to provide a control device which is easily usable by an operator and, furthermore, which is not an obstacle to the operations normally implemented so as not to encourage its tampering.

The stated technical task and specified objects are substantially achieved by a laser machining apparatus and a control device, which comprise the technical features disclosed in the respective independent claims. The dependent claims correspond to further advantageous aspects of the invention.

It should be appreciated that this summary introduces a selection of concepts in simplified form, which will be further developed in the detailed description below.

The invention relates to a laser machining apparatus which comprises a workbench having a work area on which an object to be machined by laser can be positioned, a laser emitter configured to emit a laser beam towards the work area along a direction transversal to the workbench, a movement mechanism connected to the workbench or to the laser emitter and, furthermore, configured to three-dimensionally move the workbench or the laser emitter reciprocally to each other.

In addition, the apparatus comprises a control unit connected to the movement mechanism and/or the laser emitter to generate and send an enabling signal to enable the movement mechanism and/or the laser emitter according to manipulations performed by the operator on a manipulation element connected to the same control unit. The enabling signal is thus representative of a movement of the movement mechanism along a vertical direction and/or along one or more horizontal directions and/or a combination thereof and/or the generation of a laser beam by the laser emitter. In particular, the control unit comprises a box-like body having a supporting base, a cover panel and elastic return means interposed between the supporting base and the cover panel. The cover panel and the supporting base are movable reciprocally towards and away from each other according to external forces applied by the operator on the cover panel, for example a pressing force generated by the weight or otherwise of the operator's hand resting on the cover panel. More precisely, the control unit is configurable between an active condition for allowing the sending of the enabling signal and an inactive condition for preventing the sending of the same enabling signal. In the active condition, the cover panel and the supporting base are arranged at a minimum distance apart, while in the inactive condition the cover panel and the supporting base are arranged at a greater distance with respect to the aforesaid minimum distance.

Thereby, the laser machining apparatus is advantageously capable of disabling the movement of the laser beam and/or its emission if the operator is not directly controlling the control unit, i.e., if the operator is not applying the correct resting pressure on the cover panel.

The invention further relates to a control device for the manipulation of a laser emitter and/or a movement mechanism of a laser machining apparatus in which the same movement mechanism is connected to the laser emitter and/or to a workbench on which the object to be machined by laser can be positioned to control a relative three-dimensional movement between them.

In particular, the control device comprises a box-like body having a supporting base, a cover panel and elastic return means interposed between the supporting base and the cover panel. Preferably, the cover panel and the supporting base are movable reciprocally towards and away from each other according to external forces induced by the operator on the same cover panel. The control device further comprises a control unit connected to the box-like body and connected to the movement mechanism and/or laser emitter. In particular, the control unit is configured to generate and send an enabling signal to enable the movement mechanism and/or the laser emitter according to manipulations performed by the operator on at least one manipulation element connected to the same control unit. More precisely, the enabling signal is representative of a movement of the movement mechanism along a vertical direction and/or along one or more horizontal directions and/or a combination thereof and/or a generation of a laser beam by said laser emitter.

Advantageously, the control unit is configurable between an active condition for allowing the sending of the enabling signal and an inactive condition for preventing the sending of said enabling signal. In the active condition, the cover panel and the supporting base are arranged at a minimum distance apart, while in the inactive condition the cover panel and the supporting base are arranged at a distance greater than the minimum distance.

BRIEF DESCRIPTION OF THE DRAWINGS

Further features and advantages of the present invention will become clearer from the indicative, and therefore non-limiting, description of a preferred but not exclusive embodiment of a laser machining apparatus, as illustrated in the attached drawings, in which.

With reference to the drawings, they serve solely to illustrate embodiments of the invention with the aim of better clarifying, in combination with the description, the inventive principles on which the invention is based.

DETAILED DESCRIPTION OF AT LEAST ONE EMBODIMENT

The present invention relates to a laser machining apparatus which, with reference to the figures, has been generally indicated by the number 1.

Any modifications or variants which, in the light of the description, are evident to the person skilled in the art, must be considered to fall within the scope of protection established by the present invention, according to considerations of technical equivalence.

Figure 1:
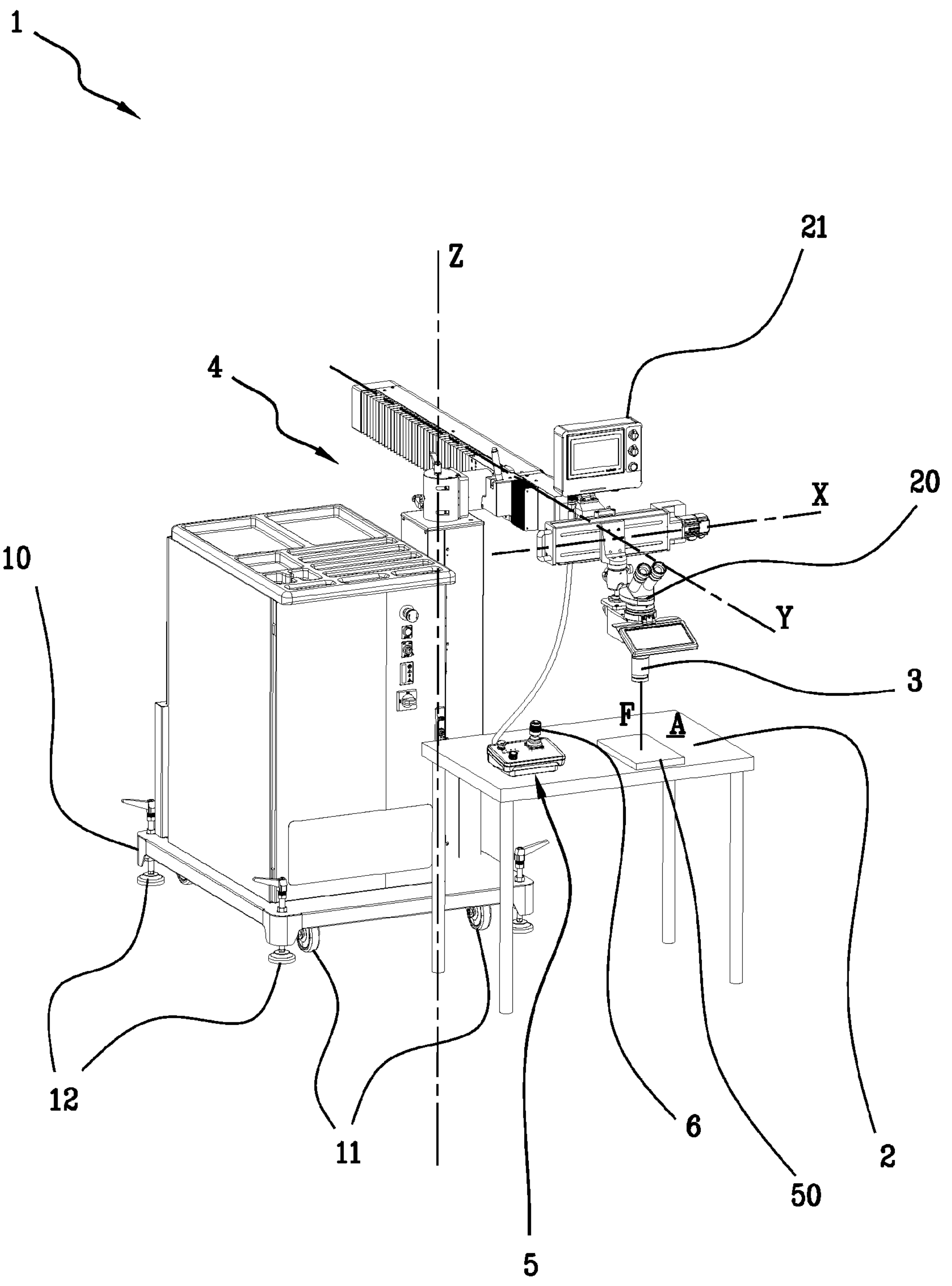
FIG. 1 illustrates, in perspective view, a first embodiment of the laser machining apparatus.
Figure 2:
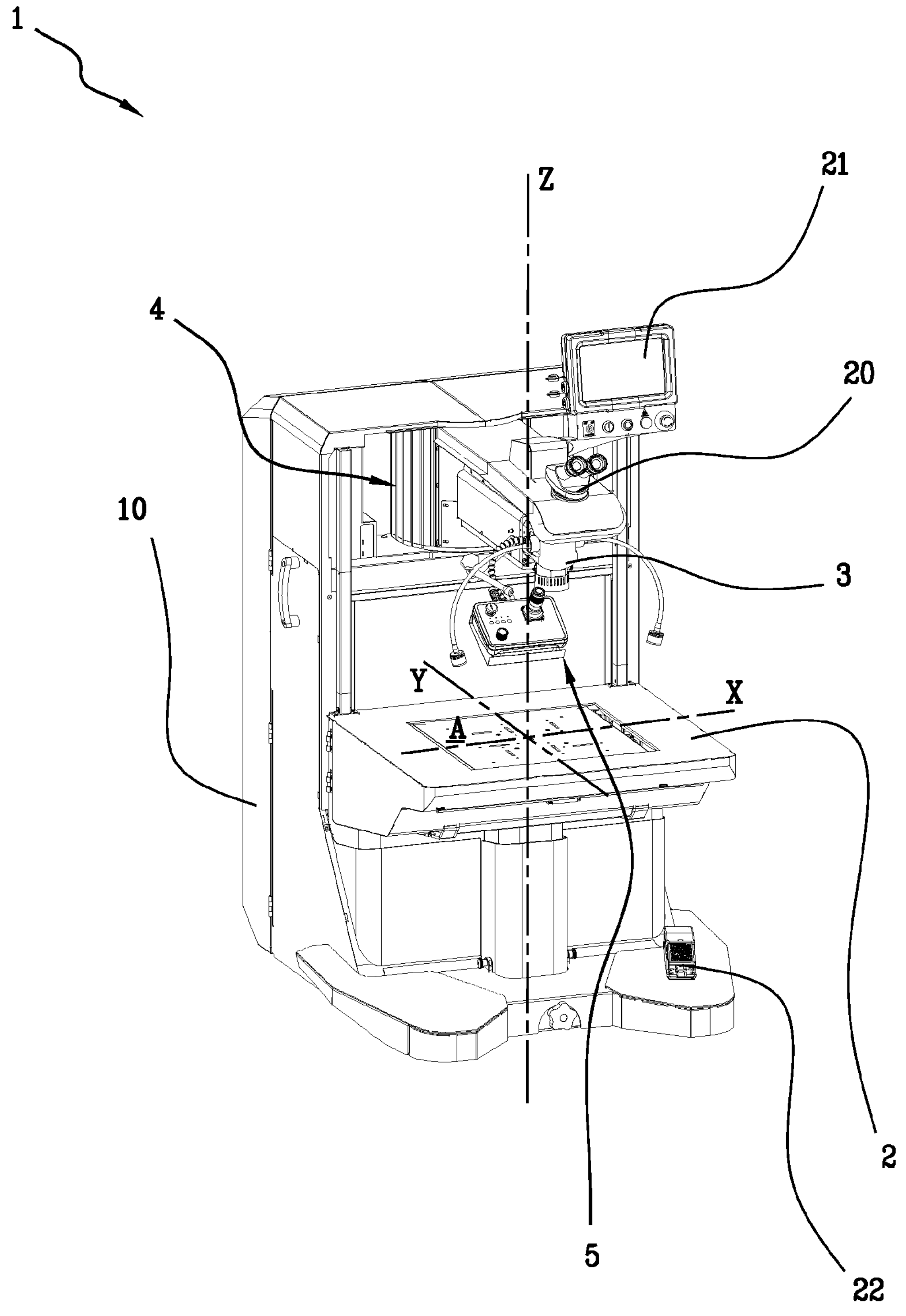
FIG. 2 illustrates, in perspective view, a second embodiment of the laser machining apparatus.

FIGS. 1 and 2 show, respectively, a first and a second embodiment of the laser machining apparatus 1.

In particular, the apparatus 1 comprises a workbench 2 having a work area A on which an object 50 to be machined by laser can be positioned, a laser emitter 3 configured to emit a laser beam F towards the work area A along a direction transversal Z to the same workbench 2, a movement mechanism 4 connected to the workbench 2 (FIG. 2) or to the laser emitter 3 (FIG. 1) configured to three-dimensionally move the same workbench 2 or the same laser emitter 3 reciprocally to each other.

Furthermore, the apparatus 1 comprises a control unit connected to the movement mechanism 4 and/or the laser emitter 3 to generate and send an enabling signal to enable the movement mechanism 4 and/or the laser emitter 3 according to manipulations performed by the operator on at least one manipulation element 6 (better illustrated in FIGS. 3A and 3B) connected to the same control unit. The enabling signal is representative of a movement along a vertical direction Z and/or along one or more horizontal directions X, Y and/or a combination thereof.

In particular, the control unit comprises a box-like body 7 having a supporting base 8, a cover panel 9 and elastic return means interposed between the supporting base 8 and the cover panel 9.

Preferably, the manipulation element 6 is arranged on the cover panel 9. Alternatively, the manipulation element 6 can be arranged on the supporting base 8 so as to protrude beyond the cover panel 9 through a through hole previously arranged on the same cover panel 9.

More precisely, the cover panel 9 and the supporting base 8 are movable reciprocally towards and away from each other according to external forces applied by the operator (arrow "P" in FIG. 3A) on the same cover panel 9, for example the pressing force generated by the weight or otherwise of the operator's hand resting on the cover panel 9 during the manipulation operations.

In particular, the control unit is configurable between an active condition for allowing the sending of the enabling signal and an inactive condition for preventing the sending of the same enabling signal. In the active condition, the cover panel 9 and the supporting base 8 are arranged at a minimum distance apart, while in the inactive condition the cover panel 9 and the supporting base 8 are arranged at a distance greater than the minimum distance.

Thereby, the laser machining apparatus 1 is advantageously capable of disabling the movement of the laser beam F and/or its emission if the operator is not directly controlling the control device 5, i.e., if the operator is not applying the correct resting pressure on the cover panel 9.

In other words, in the active condition, the control unit is configured to send a release signal which allows the reception by the laser emitter 3 and/or by the movement mechanism 4 of the enabling signal representative of the activation of the laser beam F and/or the three-dimensional movement of the latter. Otherwise, in the inactive condition, any enabling signal generated by the control unit is ignored/inhibited by the absence of reception of the release signal by the laser emitter 3 and the movement mechanism 4 and, therefore, the laser beam F cannot be activated or moved three-dimensionally with respect to the workbench 2.

Alternatively, in the inactive condition, the control unit can be configured to not generate any enabling signal.

In accordance with an aspect of the invention, the elastic return means is configured to work in extension so that, in the absence of external forces, the control unit is configured in the inactive condition.

In other words, the control unit is normally in the inactive condition (maximum distance between the cover panel 9 and the supporting base 8) and, therefore, only the application of an external force on the cover panel 9 is capable of inducing movement in the active condition, i.e., the condition in which the cover panel 9 and the supporting base are at a close distance with respect to the previous one.

For example, an operator controlling the laser beam F tends to rest his hands on the cover panel 9 so as to push the latter towards the supporting base 8, enabling the reception of the enabling signals by the laser emitter 3 and/or the movement mechanism 4.

Preferably, the elastic return means comprises a spring and/or a hydraulic piston and/or a pneumatic piston.

Figure 3A:
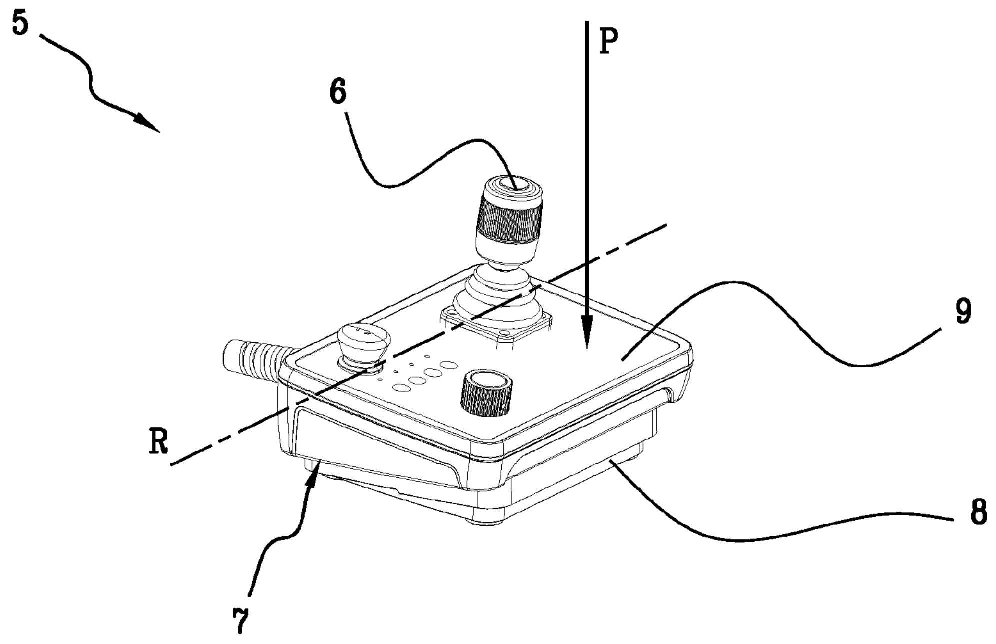
FIGS. 3A and 3B illustrate, in perspective view, the control device of the apparatus illustrated in the previous figures, respectively, in the inactive condition and in the active condition.
Figure 3B:
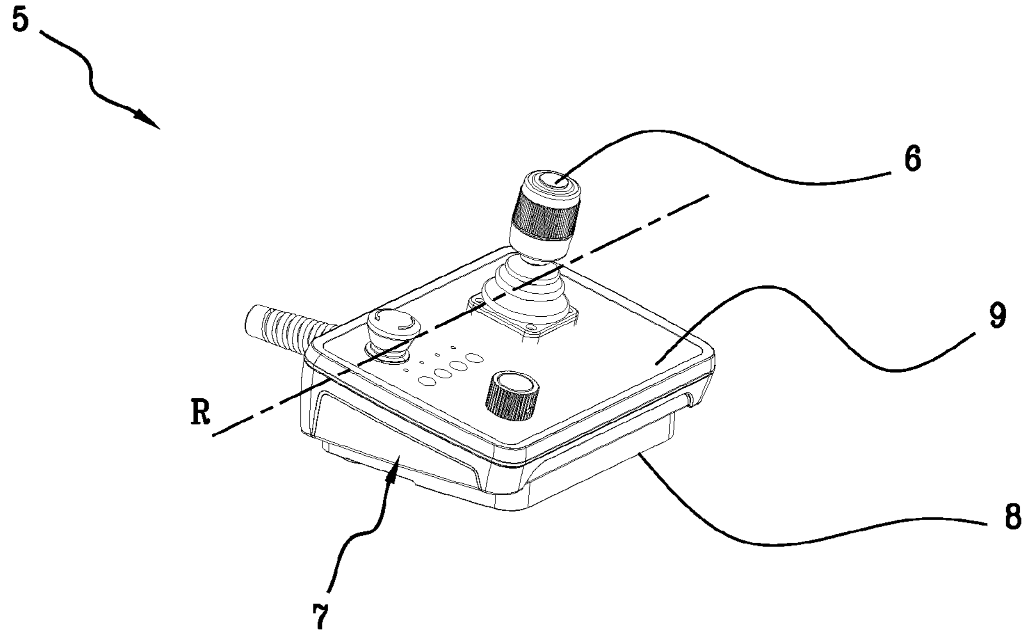

FIGS. 3A and 3B illustrate the control unit, respectively, in the inactive condition (maximum distance between the cover panel 9 and the supporting base 8) and in the active condition (minimum distance between the cover panel 9 and the supporting base 8).

In accordance with another aspect of the invention, the cover panel 9 and the supporting base 8 are rotatably connected to each other at a hinge side of the box-like body 7, which is opposite with respect to a portion of the cover panel 9 used as a rest for the hands of an operator. In particular, the cover panel 9 and the supporting base 8 are movable relative to each other with respect to a rotation axis R (visible in FIG. 3A) to define the active (approaching) and inactive (distancing) positions.

In other words, the cover panel 9 is preferably and advantageously capable of tilting with respect to the supporting base 8 so as to alternatively define the active condition and the inactive condition of the control unit.

Alternatively, any peripheral side of the box-like body 7 can have the hinge between the supporting base 8 and the cover panel 9.

In accordance with a further alternative aspect of the invention, one or more elastic return means can be interposed between the cover panel 9 and the supporting base 8 so that the cover panel 9 and the supporting base 8 are always substantially parallel to each other, even during the movement between the active condition and the inactive condition.

FIG. 1 illustrates the first embodiment of the apparatus 1, in which the workbench 2 is solidly connected to a support frame 10 arranged in a stable position. In particular, the movement mechanism 4 is connected to the laser emitter 3 to move the latter three-dimensionally with respect to the work area A.

Thereby, the workbench 2 is released from the rest of the apparatus 1 which, therefore, is advantageously movable between different workbenches 2. This solution is useful since, sometimes, it is preferable to avoid moving the objects to be machined and, therefore, it is easier to move the laser emitter 3.

In FIG. 1, in fact, the support frame 10 comprises a movement carriage having four wheels 11 for movement and, in addition, four stop elements 12 to constrain everything in a stable position when the laser beam F must be generated.

Similarly, it is also possible to keep the support frame 10 in a fixed and stable position over time and replace the workbench 2 associated therewith according to the size of the object 50 which must be machined with the laser beam F.

FIG. 2 illustrates the second embodiment of the apparatus 1, alternative with respect to that of FIG. 1, in which the laser emitter 3 is solidly connected to a support frame 10 arranged in a stable position. In particular, the movement mechanism 4 is connected to the workbench 2 to move the latter with respect to the laser emitter 3.

Unlike the previous embodiment, the workbench 2 and the laser emitter 3 are preferably constrained to the same support frame 10 so that the apparatus 1 is defined by a single structure.

FIGS. 1 and 2 further illustrate further elements which can be connected to the apparatus 1.

In fact, the apparatus 1 can comprise a microscope 20 arranged at the laser emitter 3 so that the operator can check the progress of the machining through the eyepieces of the microscope 20.

In addition, preferably, the apparatus 1 comprises a control panel 21 on which the machining data and/or any images recorded by the microscope 20 can be represented. Even more preferably, the control panel 21 comprises a touch-screen display and/or is equipped with a push-button panel so as to be able to manipulate the data and/or the images shown.

The apparatus 1 can also comprise an operating pedal board 22 connected to the laser emitter 3 and usable, alternatively, with any manipulation elements 6 connected to the control unit.

In fact, the operating pedal board 22 is preferably configured to send a laser beam activation signal F and, advantageously, allows the operator to activate/deactivate the laser beam F through a pressure of the foot. Thereby, the operator is advantageously relieved from performing a further manual operation through any manipulation elements 6 with which he must substantially manage only the movement of the laser emitter 3 with respect to the workbench 2.

Preferably, the control unit in the inactive condition is configured to send an inhibition signal of any enabling signal generated and sent by the operating pedal board 22 for the activation/deactivation of the laser beam F. More precisely, in the inactive condition the control unit is configured to not send a release signal of the laser emitter F for its activation, despite the reception of any enabling signal generated by the operating pedal board 22.

According to an aspect of the invention illustrated in FIGS. 1 and 2, the control unit is electrically connected to the movement mechanism 4.

According to an alternative aspect of the invention (not shown), the control unit is wirelessly connected to the movement mechanism 4. In this second case, the control unit comprises a wireless communication module, for example a wireless or Bluetooth module, configured to interface with another similar module connected to the laser emitter 3.

In accordance with an aspect of the invention, the movement mechanism 4 comprises a system of three-axis movement guides.

The system of three-axis movement guides comprises, for each Cartesian direction, an axis which can be moved thanks to the use of a worm screw so as to define the classic three-dimensional movement in space with respect to the workbench 2.

In accordance with another aspect of the invention, the control unit comprises a safety unit (not illustrated) enabled to configure said control unit from the active condition to the inactive condition after a predefined interval of time in which no enabling signal is received by the control unit in the active condition.

In other words, if the control unit remains locked in the active condition due to a malfunction or tampering, the safety unit is configured to force the passage from the active condition to the inactive condition after the predetermined time interval in which no commands have been generated to be sent to the laser emitter 3 and/or to the movement mechanism 4 (and, therefore, apparently the operator is not near the apparatus 1).

Therefore, if the operator is not present near the apparatus 1, the safety unit allows to prevent the control unit from sending any enabling signal to the laser emitter 3 and/or to the movement mechanism 4 which, therefore, are not capable of receiving any command to move and/or activate the laser beam F.

Preferably, the time interval has a duration of 10 minutes.

Even more preferably, the time interval has an adjustable duration which cannot exceed a maximum time equal to 30 minutes.

In accordance with another aspect of the invention, the control unit comprises a contact sensor (not illustrated) interposed between the supporting base 8 and the cover panel 9. In particular, the contact sensor is configured to detect at least the minimum distance between the cover panel 9 and the supporting base 8 and to allow or not allow the sending of the enabling signal.

In other words, when the control unit is in the active condition (minimum distance between the cover panel 9 and the supporting base 8), the contact sensor is configured to close the electrical circuit and, therefore, allow the sending of the movement and/or generation signals of the laser beam F towards, respectively, the movement mechanism 4 and/or the laser emitter 3.

Preferably, the contact sensor comprises a pair of electrodes arranged on the cover panel 9 and on the supporting base 8, opposite each other so that in the active condition they touch each other to short-circuit the circuit for sending the signals.

Alternatively to the use of an electro-mechanical type sensor such as the one described above, the contact sensor of the apparatus 1 can comprise a capacitive sensor and/or a magnetic sensor and/or an RFID-type sensor, each of which is configured to define the closure of the circuit to which is connected the generation system of the enabling signals to be sent to the laser emitter 3 and/or to the movement mechanism 4.

The present invention further relates to a control device 5 for the manipulation of a laser emitter 3 and/or a movement mechanism 4 of a laser machining apparatus 1, in which the movement mechanism 4 is connected to the laser emitter 3 and/or to a workbench 2 on which an object 50 to be machined by laser can be positioned so as to control a relative three-dimensional movement between them.

In particular, FIGS. 3A and 3B illustrate the control device 5 which comprises a box-like body 7 having a supporting base 8, a cover panel 9 and elastic return means interposed between the supporting base 8 and the cover panel 9. Preferably, the cover panel 9 and the supporting base 8 are movable reciprocally towards and away from each other according to external forces induced by the operator (arrow "P" in FIG. 3A) on the same cover panel 9.

The control device 5 further comprises a control unit connected to the box-like body 7 and connected to the movement mechanism 4 and/or to the laser emitter 3. In particular, the control unit is configured to generate and send an enabling signal to enable the movement mechanism 4 and/or the laser emitter 3 according to manipulations performed by the operator on at least one manipulation element 6 connected to the same control unit. Preferably, the enabling signal is representative of a movement of the movement mechanism 4 along a vertical direction and/or along one or more horizontal directions and/or a combination thereof and/or a generation of a laser beam by said laser emitter 3.

Advantageously, the control unit is configurable between an active condition for allowing the sending of the enabling signal and an inactive condition for preventing the sending of the enabling signal. More precisely, in the active condition, the cover panel 9 and the supporting base 8 are arranged near each other at a minimum distance apart, while in the inactive condition the cover panel 9 and the supporting base 8 are arranged away at a distance greater than the aforesaid minimum distance.

In accordance with an aspect of the invention, the elastic return means is configured to work in extension so that the control unit is configured in the inactive condition in the absence of external forces applied on the cover panel.

In accordance with another aspect of the invention, the cover panel 9 and the supporting base 8 are rotatably connected to each other at a hinge side of the box-like body 7 which is opposite with respect to a portion of the cover panel 9 used as a rest for the hands of an operator. In particular, the cover panel 9 and the supporting base 8 are movable relative to each other with respect to a rotation axis for defining the active and inactive conditions.

In accordance with a further aspect of the invention, the control unit comprises a safety unit enabled to configure the control unit from the active condition to the inactive condition after a predefined interval of time in which the control unit has not sent an enabling signal when it is configured in the active condition.

Preferably, the control unit comprises a contact sensor interposed between the supporting base 8 and the cover panel 9. In particular, the contact sensor is configured to detect at least the minimum distance between the cover panel 9 and the supporting base 8 and to allow or not allow the sending of the enabling signal.

In accordance with a preferred aspect of the invention, the control device 5 just described encloses the features of the control unit described above referring to the laser machining apparatus 1. Consequently, the features (even secondary and/or optional) related to the control unit are also attributable to the control device 5.

The present invention achieves the set objects.

In particular, the machining apparatus 1 in accordance with the invention allows to detect the presence of the operator without forcing uncomfortable operations, but in an extremely simple and comfortable manner for the operator and at low costs. Thereby, it is possible to impart commands to the laser emitter 3 and to the movement mechanism 4 only if the operator is near the same apparatus 1 and with his hand on the control device 5 (so as to apply the pressure necessary to induce the active condition). Since the invention does not force the operator to assume uncomfortable positions during the machining, the operator himself will not be at all encouraged to circumvent the protection device (problem currently present with the laser machining apparatuses of the prior art).

In other words, the control device 5 is provided with a safety system (called a "man-present" sensor) that can only be activated by pressing down (in accordance with the preferred embodiment described) the operator's hand when it is placed on the same control device 5, and more precisely on the cover panel 9, to unlock the sending and receiving of movement and/or emission signals of the laser beam F. Thereby, the apparatus 1 is capable of detecting when the operator is present and, therefore, only in this case unlocking the man-machine commands of the riskiest functions, whether these commands are present on the control device 5 (i.e., the sending of the enabling signal by the manipulation element 6), or in other parts of the apparatus 1 (i.e., the sending of the enabling signal by the pedalboard).

Resting the hand on the control device 5 is an intrinsic gesture during normal operator work operations. Therefore, the operator is not required to perform any other action to signal his presence at the apparatus 1.

In conclusion, the present invention allows to obtain the following improvements.

The main improvement is that the logic implemented in the safety system, based on the state of the "man-present" sensor arranged in the control device 5, inhibits dangerous operations when the operator moves away, or has left the controls. It therefore allows to avoid, for example, the possibility of undesired movements of the movement mechanism 4 and/or of the laser beam F, or the generation and emission of uncontrolled laser radiation when the operator is not present in front of the apparatus 1 or is setting up the work area, or is positioning the object 50 to be machined.

Another improvement is that the dangerous operations can therefore be performed by the apparatus 1 only if the operator is present and, furthermore, if he has activated the commands to perform the required operations (including pressing the control device 5 to move it in the active condition). This means that in the event of anomalies (for example, an actuation of the movement mechanism 4 due to a control software error), it is sufficient to remove the hand from the control device 5 (or, more precisely, to reduce until cancelling the pressure induced on the control device 5 by the operator's hand) to interrupt any operation of the apparatus 1.

What has just been described allows to obtain a technical solution which considerably increases the simplicity of use and ergonomics with respect to the technical solutions currently known.

The invention claimed is:

1. A control device for the manipulation of a laser emitter and/or a movement mechanism of a laser machining apparatus, wherein said movement mechanism is connectable to said laser emitter and/or to a workbench in order to control a relative three-dimensional movement between them, the control device comprising:

a box-like body having a supporting base, a cover panel, and an elastic return means interposed between said supporting base and said cover panel, said cover panel and said supporting base being movable reciprocally towards and away from each other according to external forces applied on said cover panel;

at least one manipulation element arranged on the control device; and a control unit connected to said box-like body and suitable to be connected to said movement mechanism and/or to said laser emitter, said control unit being configured to generate and send an enabling signal suitable to enable the movement mechanism and/or the laser emitter according to manipulations performed by the operator on said at least one manipulation element connected to said control unit, said enabling signal being suitable to be representative of a movement of said movement mechanism;

said control unit being configurable between an active condition for allowing the sending of said enabling signal when said cover panel and said supporting base are arranged near each other at a minimum distance apart, and an inactive condition for preventing the sending of said enabling signal when said cover panel and said supporting base are positioned away from each other by a distance greater than said minimum distance;

said control unit comprising a contact sensor interposed between said supporting base and said cover panel, wherein said contact sensor is configured to detect at least said minimum distance between said cover panel and said supporting base and to allow or not allow the sending of said enabling signal;

said cover panel and said supporting base being rotatably connected to each other at a hinge side of the box-like body opposite with respect to a portion of said cover panel suitable to be used as a rest for the operator's hands; and said cover panel and said supporting base being movable relative to each other with respect to a rotation axis so as to define the active and inactive conditions.

2. The control device according to claim 1, wherein said at least one manipulation element is arranged on the cover panel.

3. The control device according to claim 1, wherein said at least one manipulation element is arranged on the supporting base and protrudes beyond the cover panel through a through hole of the cover panel.

4. The control device according to claim 1, wherein said elastic return means is configured to work in extension so that, in the absence of external forces applied on said cover panel, said control unit is configured in the inactive condition.

5. The control device according to claim 1, wherein said control unit comprises a safety unit enabled to configure said control unit from the active condition to the inactive condition after a predefined interval of time in which said control unit has not sent any enabling signal when in the active condition.

6. A laser machining apparatus, comprising:

a workbench having a work area on which an object to be machined by laser can be positioned;

a laser emitter configured to emit a laser beam toward said work area along a direction transversal to said workbench;

a movement mechanism connected to said workbench or to said laser emitter and configured to move said workbench or said laser emitter three-dimensionally and reciprocally to each other;

a control device according to claim 1, wherein a the control unit is connected to said movement mechanism and/or to said laser emitter and, in use, configured to generate and send an enabling signal to enable the movement mechanism and/or the laser emitter according to manipulations performed by the operator on the least one manipulation element connected to said control unit, said enabling signal being representative of a movement of said movement mechanism.

7. The apparatus according to claim 6, wherein said elastic return means is configured to work in extension so that, in the absence of external forces applied on said cover panel, said control unit is configured in the inactive condition.

8. The apparatus according to claim 6, wherein said workbench is solidly connected to a support frame arranged in a stable position, said movement mechanism being connected to said laser emitter in order to move the laser emitter with respect to said work area.

9. The apparatus according to claim 6, wherein said laser emitter is solidly connected to a support frame arranged in a stable position, said movement mechanism being connected to said workbench in order to move the workbench with respect to said laser emitter.

10. The apparatus according to claim 6, wherein said control unit is electrically connected to said movement mechanism and/or to said laser emitter.

11. The apparatus according to claim 6, wherein said control unit is wirelessly connected to said movement mechanism and/or to said laser emitter.

12. The apparatus according to claim 6, wherein said movement mechanism comprises a system of three-axis movement guides.

13. The apparatus according to claim 6, wherein said control unit comprises a safety unit enabled to configure said control unit from the active condition to the inactive condition after a predefined interval of time in which no enabling signal is received by the control unit when in the active condition.

* * * * *